United States Patent
Wang

(10) Patent No.: US 9,253,149 B2
(45) Date of Patent: *Feb. 2, 2016

(54) METHOD FOR PROVIDING AN INTERNAL SERVER WITH A SHARED PUBLIC IP ADDRESS

(71) Applicant: HUAWEI TECHNOLOGIES CO., LTD., Shenzhen, Guangdong (CN)

(72) Inventor: Ning Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/489,484

(22) Filed: Sep. 18, 2014

(65) Prior Publication Data

US 2015/0003462 A1  Jan. 1, 2015

Related U.S. Application Data

(63) Continuation of application No. 12/038,451, filed on Feb. 27, 2008, now Pat. No. 8,861,522, which is a continuation-in-part of application No. 10/420,208, filed on Apr. 22, 2003, now Pat. No. 7,362,760.

(30) Foreign Application Priority Data

May 15, 2002 (CN) .................................. 02116797

(51) Int. Cl.
    *H04L 12/741* (2013.01)
    *H04L 29/12* (2006.01)
    *H04L 12/721* (2013.01)

(52) U.S. Cl.
    CPC ...... *H04L 61/2517* (2013.01); *H04L 29/12377* (2013.01); *H04L 29/12509* (2013.01); *H04L 45/72* (2013.01); *H04L 45/745* (2013.01); *H04L 61/256* (2013.01); *H04L 61/2567* (2013.01)

(58) Field of Classification Search
    None
    See application file for complete search history.

(56) References Cited

U.S. PATENT DOCUMENTS

| | | | |
|---|---|---|---|
| 6,128,664 A | 10/2000 | Yanagidate et al. |
| 6,457,061 B1 | 9/2002 | Bal et al. |
| 6,535,511 B1 | 3/2003 | Rao |
| 6,567,405 B1 | 5/2003 | Borella et al. |

(Continued)

OTHER PUBLICATIONS

Eun-Sang Lee et al; An Expanded NAT with Server Connection Ability; Jun. 1999, 1999 IEEE TENCON; vol. 2, total 4 pages.

(Continued)

*Primary Examiner* — Brian Roberts
(74) *Attorney, Agent, or Firm* — Huawei Technologies Co., Ltd.

(57) ABSTRACT

A method for allowing a device in an external network to access a server in an internal network via a public IP address. A routing equipment receives a message carrying a destination IP address and a destination port number from the device, matches the destination IP address and the destination port number with external characteristics of the server in a mapping table established on the routing equipment. If a match exists, the routing equipment replaces the destination IP address and the destination port number with the internal IP address and the internal port number. The mapping table includes a correlation between external characteristics and internal characteristics of the server. The external characteristics include the external IP address and the external port number of the server. The internal characteristics include the internal IP address and the internal port number.

17 Claims, 3 Drawing Sheets

(56) References Cited

U.S. PATENT DOCUMENTS

| | | |
|---|---|---|
| 6,697,354 B1 | 2/2004 | Borella et al. |
| 6,985,479 B2 * | 1/2006 | Leung et al. .......... 370/352 |
| 7,362,760 B2 | 4/2008 | Wang |
| 2002/0024959 A1 | 2/2002 | Kong |
| 2002/0129165 A1 | 9/2002 | Dingsor et al. |
| 2003/0007486 A1 | 1/2003 | March et al. |
| 2003/0088787 A1 | 5/2003 | Egevang |
| 2004/0252683 A1 | 12/2004 | Kennedy et al. |

OTHER PUBLICATIONS

P. Srisuresh et al; IP Network Address Translator (NAT) Terminology and Considerations; Lucent Technologies; Request for Comments: 2663; Aug. 1999; total 30 pages.

P. Srisuresh et al; Traditional IP Network Address Translator (Traditional NAT); Intel Corporation; Request for Comments: 3022; Obsoletes: 1631; Jan. 2001; total 17 pages.

* cited by examiner

METHOD FOR PROVIDING AN INTERNAL SERVER WITH A SHARED PUBLIC IP ADDRESS

CROSS-REFERENCE TO RELATED APPLICATIONS

The present application is a continuation of U.S. patent application Ser. No. 12/038,451, filed on Feb. 27, 2008, which is a continuation-in-part of U.S. patent application Ser. No. 10/420,208, filed on Apr. 22, 2003, now U.S. Pat. No. 7,362,760. The U.S. patent application Ser. No. 10/420,208 claims priority to Chinese Patent Application No. 02116797.4, filed on May 15, 2002, now Chinese Patent CN 02116797.4. The aforementioned patent applications are hereby incorporated by reference in their entireties.

BACKGROUND OF THE INVENTION

1. Field of the Invention

The present invention relates to network communication technologies, particularly to a method for providing a server in an internal network with a shared public Internet Protocol (IP) address.

2. Background of the Invention

The Network Address Translation (NAT) technology provides a method of accessing the Internet from hosts in a Local Area Network (LAN), and the method solves the problem of insufficient IP addresses. Under the NAT technology, however, the internal hosts in the LAN are invisible to the Internet, i.e., hosts in the Internet cannot proactively access an internal host in the LAN. For example, there is a host with an IP address of 10.110.0.0/24 in a LAN, and the LAN is connected to the Internet via a private line and has a valid public IP address of 202.38.160.1 provided by an Internet Service Provider (ISP). Through the NAT technology, all hosts in the LAN can share the IP address 202.38.160.1 to access the Internet. However, hosts on the Internet are unable to proactively access any internal host in the LAN.

With the development of network technologies, many organizations begin to establish internal LANs using private addresses. Sometimes, internal hosts in such a LAN store resources, and they need to be accessed by users on the Internet. For example, a LAN includes a host that provides a web server, and users on the Internet may access the host providing the web server in the LAN. Currently, in order to enable users on the Internet to access a host in a LAN, a "static mapping" configuration technique is used. For example, a web server is set up in a LAN, and the web server's internal IP address is 10.110.0.1. A "static mapping" configuration binds the web server's internal IP address 10.110.0.1 with a valid IP address 202.38.160.1, provided by an ISP. Thus, if a host on the Internet wants to access the web server, it can access the host with the internal IP address 10.110.0.1 through the binding IP address 202.38.160.1. Although the above method satisfies the requirement for providing an internal server in the LAN, other hosts in the LAN, at the same time, cannot access the Internet with the valid IP address, which results in waste of the valid public IP address. Furthermore, the LAN cannot provide other services (such as Domain Name Server (DNS) or File Transfer Protocol (FTP) server) to the Internet users.

Therefore, the method for providing an internal server with a static binding IP address, as with the traditional technology, has the following disadvantages:

First, although the method of static IP address binding enables hosts on the Internet to access an internal server in the LAN, the IP address provided to the LAN is not utilized in full, which results in a waste of limited IP address resources.

Second, the scheme has a potential security risk: a server usually provides a single service to outside users, for example, a web server is just used to deliver a Hypertext Transfer Protocol (HTTP) service to the external world, and the host of the web server only needs to provide a port 80 for outside access. However, if the web server is provided through the static binding method, users in external networks can access not only the port 80, but also other ports. For example, some servers can be maintained through Telnet access, such maintenance should only be done through internal network equipments, however, if the static binding method is used for IP address translation, hosts in the external networks or the Internet can also access the server through Telnet, thus bringing potential security risk for the internal server.

Third, according to the traditional technology, internal services cannot be provided through non-standard ports of the internal server, for example, if two web servers are to be provided in the LAN and one of them has to use port 8080 instead of port 80, this cannot be realized according to the traditional technology.

SUMMARY OF THE INVENTION

An object of the present invention is to provide a method and an apparatus for providing a server in an internal network with a shared public IP address, to enable conservation of public IP addresses and guarantee security of servers in the internal network.

According to a first aspect of the present invention, a routing apparatus for allowing a device in an external network to access a server in an internal network is provided. The server and at least one other host in the internal network share a public Internet protocol (IP) address. The routing apparatus includes a memory and a processor. The memory stores a correlation between external characteristics of the server and internal characteristics of the server in a mapping table, and program codes that includes various instructions. The external characteristics of the server include an external IP address and an external port number of the server. The internal characteristics of the server include an internal IP address and an internal port number of the server. The external IP address is configured to be the public IP address. The correlation is established according to parameters configured by a user on the routing apparatus. The parameters include the external IP address, the external port number of the server, the internal IP address and the internal port number of the server. The processor is configured to execute the instructions.

The various instructions include: instructions for determining whether a destination IP address and a destination port number carried in a first message received from the device match the external characteristics of the server by looking up the mapping table; instructions for modifying the first message by replacing the destination IP address and the destination port number carried in the first message with the internal IP address and the internal port number that are correlated to the external IP address and the external port number of the server in the mapping table, if the destination IP address and the destination port number carried in the first message match the external characteristics of the server; and instructions for forwarding the modified first message to the server.

According to a second aspect of the present invention, a method for allowing a device in an external network to access a server in an internal network through a routing apparatus is provided. The server and at least one other host in the internal network share a public Internet protocol (IP) address. The routing apparatus establishes a correlation between external characteristics of the server and internal characteristics of the server, and stores the correlation in a mapping table. The correlation is established according to parameters configured by a user on the routing apparatus. The parameters include an external IP address, an external port number, an internal IP address and an internal port number of the server. The external characteristics of the server include the external IP address and the external port number of the server. The internal characteristics of the server include the internal IP address and the internal port number of the server. The external IP address is configured to be the public IP address.

The routing apparatus receives a first message from the device. The first message carries a destination IP address and a destination port number. The routing apparatus determines whether the destination IP address and the destination port number carried in the first message match the external characteristics of the server by looking up the mapping table. If the destination IP address and the destination port number carried in the first message matches the external characteristics of the server, the routing apparatus modifies the first message by replacing the destination IP address and the destination port number carried in the first message with the internal IP address and the internal port number that are correlated to the external IP address and the external port number of the server in the mapping table. The routing apparatus then forwards the modified first message to the server.

According to a third aspect of the present invention, a computer program product is provided. The computer program product includes a storage medium that stores various computer-executable instructions. The instructions, when executed by a computer acting as a routing apparatus, allow a device in an external network to access a server in an internal network through the routing apparatus. The server and at least one other host in the internal network share a public Internet protocol (IP) address. The computer-executable instructions include instructions for establishing a correlation between external characteristics of the server and internal characteristics of the server, and storing the correlation in a mapping table. The external characteristics of the server include an external IP address and an external port number of the server, and the internal characteristics of the server include an internal IP address and an internal port number of the server. The external IP address is configured to be the public IP address The computer-executable instructions also include: instructions for determining whether a destination IP address and a destination port number carried in a first message received from the device match the external characteristics of the server by looking up the mapping table; instructions for modifying the first message by replacing the destination IP address and the destination port number carried in the first message with the internal IP address and the internal port number that are correlated to the external IP address and the external port number of the server in the mapping table if the destination IP address and the destination port number carried in the first message matches the external characteristics of the server; and instructions for forwarding the modified first message to the server. The correlation is established according to parameters configured by a user on the routing apparatus. The parameters include the external IP address, the external port number of the server, the internal IP address and the internal port number of the server.

According to a fourth aspect of the present invention, a network system for allowing a device in an external network to access a server in an internal network is provided. The server and at least one other host in the internal network share a public Internet protocol (IP) address. The network system includes a routing apparatus and the server. The routing apparatus stores a correlation between external characteristics of the server and internal characteristics of the server in a mapping table. The external characteristics of the server include an external IP address and an external port number of the server, and the internal characteristics of the server include an internal IP address and an internal port number of the server. The external IP address is configured to be the public IP address. The routing apparatus determines whether a destination IP address and a destination port number carried in a first message received from the device match the external characteristics of the server by looking up the mapping table, modifies the first message by replacing the destination IP address and the destination port number carried in the first message with the internal IP address and the internal port number that are correlated to the external IP address and the external port number of the server in the mapping table if the destination IP address and the destination port number carried in the first message match the external characteristics of the server, and forward the modified first message to the server. The correlation is established according to parameters configured by a user on the routing apparatus, the parameters include the external IP address, the external port number of the server, the internal IP address and the internal port number of the server.

Seen from the above technical solutions of the present invention, web servers and FTP servers in a LAN can be easily provided without occupying a valid IP address for each server. For example, a web server and a FTP server in the LAN are not in the same host and they have different internal private IP addresses, but they can still provide services for the external network via a valid public IP address. The present invention saves limited valid IP address resources and solves the problem of waste of valid public IP addresses in the traditional scheme by providing a static address mapping for each internal server. In addition, the scheme of the present invention implements port-level support to the internal server, enabling users to configure the internal server to provide for external ports and protocols according to their own requirements. For example, through configuring a web server, users in external networks can access the web server with an internal IP address 10.110.10.10 via the address http://202.110.10.10: 8080, i.e. port 8080 of the internal server.

DETAILED DESCRIPTION OF THE EMBODIMENTS

Figure 1:
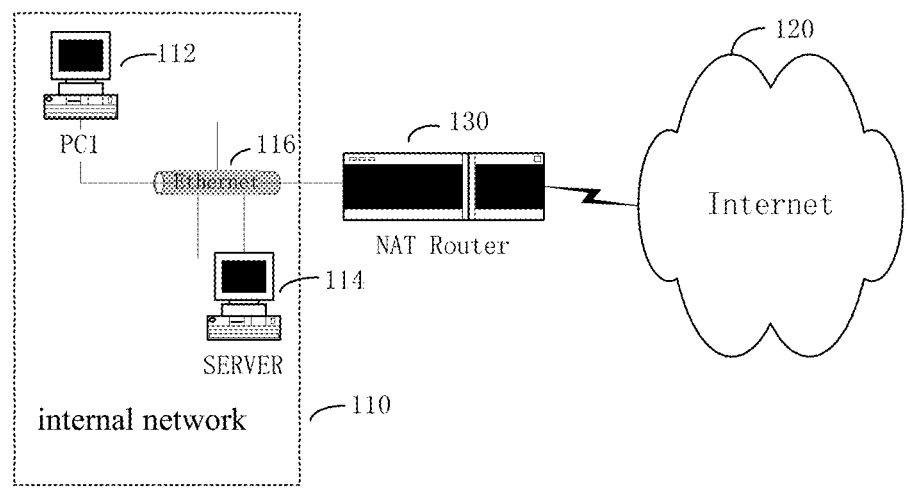
FIG. 1 is a schematic presentation of an application environment of the present invention.

The application environment is shown in FIG. 1, in which an internal network 110 (such as a local area network (LAN)) accesses the Internet 120 via a routing apparatus such as a NAT Router 130. The internal network 110 includes an internal host personal computer 112, and an internal server 114 connected with the internal host 112 through an Ethernet 116. The internal network 110 acquires a valid public IP address from an ISP, and hosts in the internal network 110 can share the public IP address to access the Internet 120. At the same time, according to an embodiment of the present invention, the internal server 114 in the internal network 110 can provide one or more services to external hosts, i.e., the external hosts can access the internal server 114 via the valid public IP address. In addition, in order to guarantee the security of the internal server 114, according to an embodiment of the present invention, external hosts accessing the internal server 114 only through a designated port, i.e., the internal server 114 can be configured to provide the services to the external hosts through a specific port.

Figure 2:
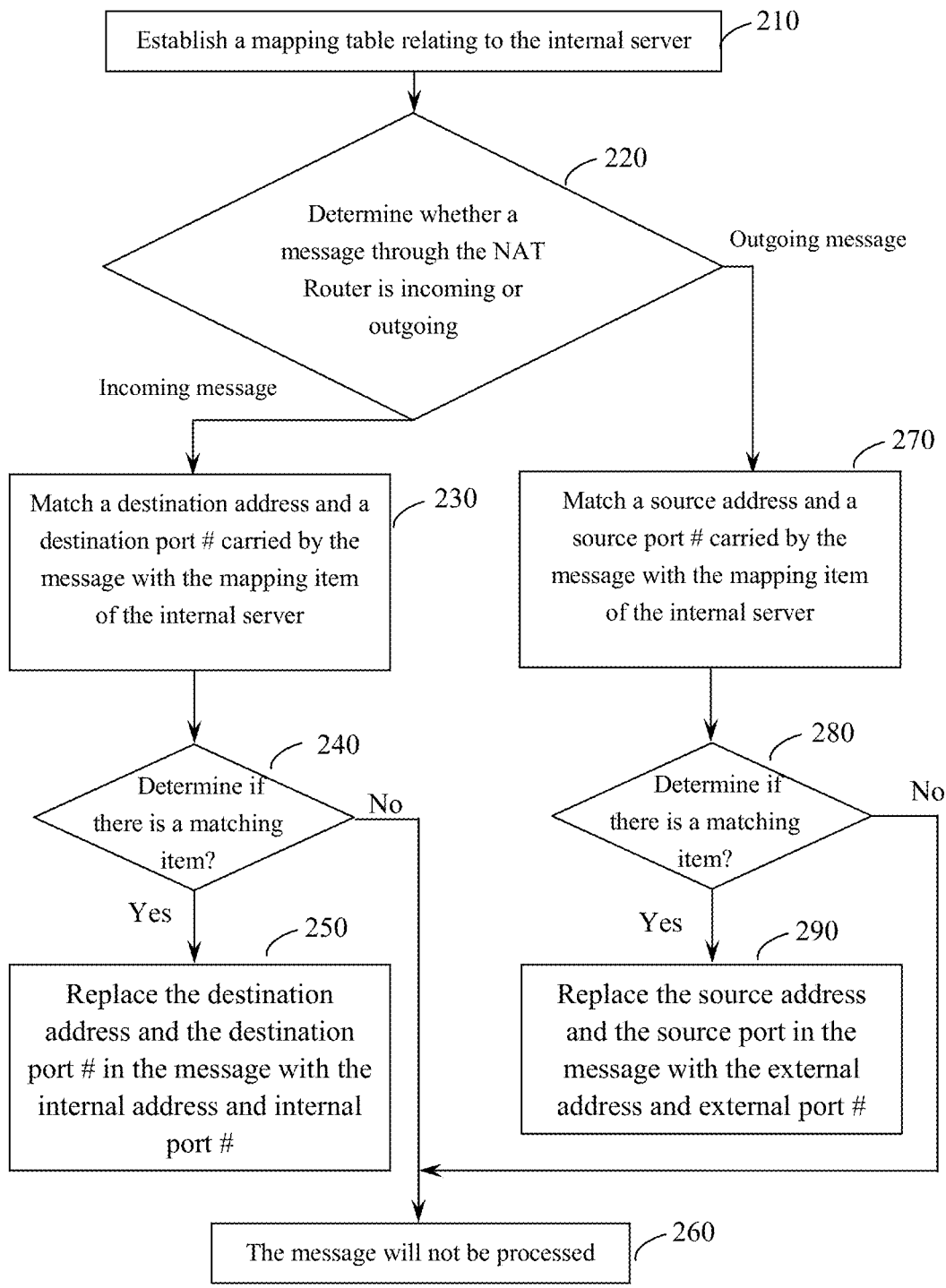
FIG. 2 is a flow chart of a method for providing an internal server according to an embodiment of the present invention.

Referring now to FIG. 2, according to an embodiment of the present invention, a method for providing a server in an internal network with a shared public IP address includes the following:

210: A user configures an external IP address, an external port number, and an external protocol code of an internal server, as well as an internal IP address, an internal port number, and an internal protocol code of the internal server on a NAT Router through with the internal server accesses the Internet (with reference to FIG. 1). The user further establishes a mapping table relating to the internal server according to the above-configured parameters, to enable external hosts to access the internal server through a valid public IP address of the internal network and a port of the internal server which is configured to provide services of the internal server to the external hosts.

Then, information carried in an incoming message (i.e. a message received from the Internet) or an outgoing message (i.e. a message transmitted to the Internet) is matched with configured corresponding relationship information. Details of the matching includes the following:

220: First, it is determined whether a message passing through the NAT Router is an incoming message or an outgoing message.

230: If the message passing through the NAT Router is an incoming message, match a destination IP address, a destination port number, and a protocol code carried in the incoming message with the external IP address, the external port number, and the external protocol code of the internal server recorded in the mapping table.

240: determine whether there is a matching item in the mapping table that matches the destination IP address, the destination port number and the protocol code carried in the incoming message with the external IP address, the external port number and the external protocol code of the internal server.

250: If there is a matching item in the mapping table of the internal server, replace the destination IP address and the destination port number carried in the incoming message with the internal IP address and the internal port number of the server.

260: if there is no matching item in the mapping table of the internal server, the incoming message will not be processed. Alternatively, if there is no item in the mapping table of the internal server that matches the relevant information of the incoming message with that of the internal server, the incoming message may be processed in another process.

270: If the message passing through the NAT Router is an outgoing message, match a source IP address, a source port number, and a source protocol code carried in the outgoing message with the internal IP address, the internal port number, and the internal protocol code of the internal server configured in the matching table of the internal server.

280: determine whether there is a matching item in the mapping table of the internal server that matches the source IP address, the source port number and the source protocol code carried in the outgoing message with the internal IP address, the internal port number and the internal protocol code of the internal server.

290: If there is a matching item in the mapping table of the internal server, replace the source IP address and the source port number carried in the outgoing message with the external IP address and external port number of the internal server.

If there is no matching item in the mapping table of the internal server, the message will not be processed, referring to the step 260 above. Alternatively, the outgoing message may be handed over to other nodes of the internal network for processing.

Summarizing the above, a message is processed according to the matching result.

For an incoming message, the destination IP address and the destination port number carried in the message are replaced with the internal IP address and the internal port number of the internal server corresponding to the external IP address and the external port number configured in the mapping table of the internal server that match the destination IP address and the destination port number. The message is forwarded, thus, the internal server with a matching internal IP address can receive the incoming message from the outside correctly.

For an outgoing message, the source IP address and the source port number carried in the message are replaced with the external IP address and the external port number of the internal server configured in the mapping table of the internal server that match the source IP address and the source port number. Thus, the outgoing message is forwarded normally.

According to an embodiment of the present invention, because that the valid public IP address acquired from an ISP is not bound to only one private IP address of the internal network statically, other hosts in the internal network can also access the Internet via the public IP address. At the same time, through configuring the mapping table of the internal server correctly, a port providing services of the internal server can be designated to guarantee security of the internal server. In conclusion, only messages matching with relevant information in the mapping table of the internal server established by a user can be exchanged between the internal server in the internal network and an external host, thus invalid access to internal server from an external host is prohibited.

Furthermore, the operation procedure of the method according to an embodiment of the present invention described above can also be implemented in the form of a computer executable program stored in various machine readable storage media.

Figure 3:
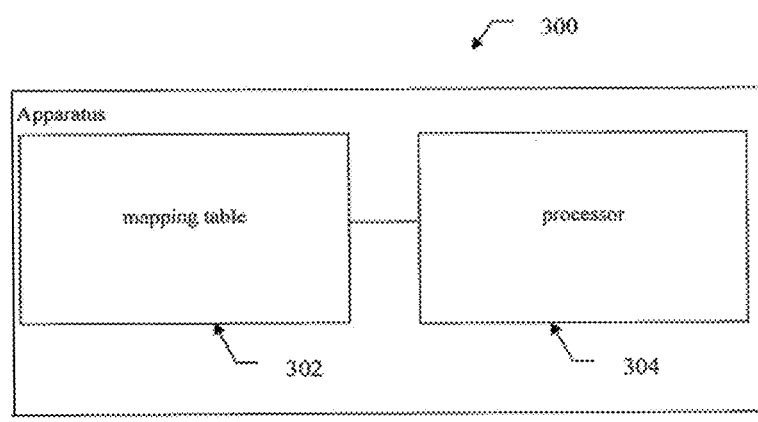
FIG. 3 is a simplified block diagram of a routing apparatus according to an embodiment of the present invention.

FIG. 3 is a simplified block diagram of an apparatus according to an embodiment of the present invention. The apparatus 300 as shown in FIG. 3, e.g. NAT Router 130 as shown in FIG. 1, includes a mapping table 302 and a processor 304.

The mapping table 302 is preferably stored in a machine-readable storage medium such as a memory device, which also stores program codes for execution by the processor 304. The method provided in the above embodiment of the invention can be performed by the processor 304 executing the program codes. The processor may be a central processing unit (CPU) of a system or a device.

At this time, as long as the system or device has a function of executing a program, implementing modes of an embodiment of the present invention are not limited to the program, and the program can be in any form of, for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, an embodiment of the present invention may be achieved by a computer by downloading the computer program codes according to the above-mentioned embodiment of the present invention from the Internet, and installing the same into the computer and then executing the program codes.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

I claim:

1. A routing apparatus for allowing a device in an external network to access a server in an internal network, wherein the server and at least one other host in the internal network share a public Internet protocol (IP) address, the routing apparatus comprising:
    a memory, configured to store a correlation between external characteristics of the server and internal characteristics of the server in a mapping table, and program codes comprising instructions, wherein the external characteristics of the server comprise an external IP address and an external port number of the server, and the internal characteristics of the server comprise an internal IP address and an internal port number of the server, wherein the external IP address is configured to be the public IP address; and
    a processor, configured to execute the instructions, wherein the instructions comprise:
    instructions for determining whether a destination IP address and a destination port number carried in a first message received from the device match the external characteristics of the server by looking up the mapping table;
    instructions for modifying the first message by replacing the destination IP address and the destination port number carried in the first message with the internal IP address and the internal port number that are correlated to the external IP address and the external port number of the server in the mapping table if the destination IP address and the destination port number carried in the first message match the external characteristics of the server; and
    instructions for forwarding the modified first message to the server,
    wherein the correlation is established according to parameters configured by a user on the routing apparatus, the parameters comprise the external IP address, the external port number, the internal IP address and the internal port number of the server.

2. The routing apparatus according to claim 1, wherein the external characteristics further comprise an external protocol code of the server, the internal characteristics further comprise an internal protocol code of the server, and the first message further comprises a protocol code, and
    wherein the instructions for determining comprise:
    instructions for determining whether the destination IP address, the destination port number and the protocol code carried in the first message match the external IP address, the external port number and the external protocol code of the server by looking up the mapping table.

3. The routing apparatus according to claim 2, wherein the parameters further comprise the external protocol code of the server and the internal protocol code of the server.

4. The routing apparatus according to claim 1, wherein the instructions stored in the memory further comprise:
    instructions for determining whether a source IP address and a source port number carried in a second message received from the server match the internal characteristics of the server by looking up the mapping table; and
    instructions for modifying the second message by replacing the source IP address and the source port number carried in the second message with the external IP address and the external port number that are correlated to the internal IP address and the internal port number of the server in the mapping table if the source IP address and the source port number carried in the second message match the internal characteristics of the server.

5. A method for allowing a device in an external network to access a server in an internal network through a routing apparatus, wherein the server and at least one other host in the internal network share a public Internet protocol (IP) address, the method comprising:
    establishing a correlation between external characteristics of the server and internal characteristics of the server, and storing the correlation in a mapping table, wherein the external characteristics of the server comprise an external IP address and an external port number of the server, and the internal characteristics of the server comprise an internal IP address and an internal port number of the server, wherein the external IP address is configured to be the public IP address;
    receiving, by the routing apparatus, a first message from the device, wherein the first message carries a destination IP address and a destination port number;
    determining, by the routing apparatus, whether the destination IP address and the destination port number carried in the first message match the external characteristics of the server by looking up the mapping table;
    if the destination IP address and the destination port number carried in the first message matches the external characteristics of the server, modifying the first message by replacing the destination IP address and the destination port number carried in the first message with the internal IP address and the internal port number that are correlated to the external IP address and the external port number of the server in the mapping table; and
    forwarding, by the routing apparatus, the modified first message to the server,
    wherein the correlation is established according to parameters configured by a user on the routing apparatus, the parameters comprise the external IP address, the external port number of the server, the internal IP address and the internal port number of the server.

6. The method according to claim 5, wherein the external characteristics of the server further comprise an external protocol code of the server, the internal characteristics of the server further comprise an internal protocol code of the server, and the first message further comprises a protocol code; and
    wherein determining whether the destination IP address and the destination port number carried in the first message match the external characteristics of the server by looking up the mapping table comprises:

determining whether the destination IP address, the destination port number and the protocol code carried in the first message match the external IP address, the external port number and the external protocol code of the server by looking up the mapping table.

7. The method according to claim 6, wherein the parameters further comprise the external protocol code of the server and the internal protocol code of the server.

8. The method according to claim 5, further comprising:
receiving, by the routing apparatus, a second message from the server, wherein the second message carries a source IP address and a source port number;
determining, by the routing apparatus, whether the source IP address and the source port number carried in the second message match the internal characteristics of the server by looking up the mapping table; and
if the source IP address and the source port number carried in the second message match the internal characteristics of the server, modifying the second message by replacing the source IP address and the source port number carried in the second message with the external IP address and the external port number that are correlated to the internal IP address and the internal port number of the server in the mapping table.

9. A computer program product comprising a non-transitory storage medium storing computer-executable instructions which, when executed by a computer acting as a routing apparatus, allow a device in an external network to access a server in an internal network, wherein the server and at least one other host in the internal network share a public Internet protocol (IP) address, the computer-executable instructions comprising:
instructions for establishing a correlation between external characteristics of the server and internal characteristics of the server, and storing the correlation in a mapping table, wherein the external characteristics of the server comprise an external IP address and an external port number of the server, and the internal characteristics of the server comprise an internal IP address and an internal port number of the server, wherein the external IP address is configured to be the public IP address;
instructions for determining whether a destination IP address and a destination port number carried in a first message received from the device match the external characteristics of the server by looking up the mapping table;
instructions for modifying the first message by replacing the destination IP address and the destination port number carried in the first message with the internal IP address and the internal port number that are correlated to the external IP address and the external port number of the server in the mapping table if the destination IP address and the destination port number carried in the first message matches the external characteristics of the server; and
instructions for forwarding the modified first message to the server,
wherein the correlation is established according to parameters configured by a user on the routing apparatus, the parameters comprise the external IP address, the external port number of the server, the internal IP address and the internal port number of the server.

10. The computer program product according to claim 9, wherein the external characteristics further comprise an external protocol code of the server, the internal characteristics further comprise an internal protocol code of the server, and the first message further comprises a protocol code;
wherein the instructions for determining comprise:
instructions for determining whether the destination IP address and the destination port number and the protocol code carried in a first message received from the device match the external IP address, the external port number and the external protocol code of the server by looking up the mapping table.

11. The computer program product according to claim 10, wherein the parameters further comprise the external protocol code of the server and the internal protocol code of the server.

12. A network system for allowing a device in an external network to access a server in an internal network, wherein the server and at least one other host in the internal network share a public Internet protocol (IP) address, the network system comprising a routing apparatus and the server,
wherein the routing apparatus is configured to:
store a correlation between external characteristics of the server and internal characteristics of the server in a mapping table, wherein the external characteristics of the server comprise an external IP address and an external port number of the server, and the internal characteristics of the server comprise an internal IP address and an internal port number of the server, wherein the external IP address is configured to be the public IP address;
determine whether a destination IP address and a destination port number carried in a first message received from the device match the external characteristics of the server by looking up the mapping table;
modify the first message by replacing the destination IP address and the destination port number carried in the first message with the internal IP address and the internal port number that are correlated to the external IP address and the external port number of the server in the mapping table if the destination IP address and the destination port number carried in the first message match the external characteristics of the server; and
forward the modified first message to the server,
wherein the correlation is established according to parameters configured by a user on the routing apparatus, the parameters comprise the external IP address, the external port number of the server, the internal IP address and the internal port number of the server.

13. The network system according to claim 12, further comprising the device.

14. A routing apparatus for allowing a device in an external network to access a server in an internal network, wherein the server and at least one other host in the internal network share a public Internet protocol (IP) address, the routing apparatus comprising:
a memory, configured to store a correlation between external characteristics of the server and internal characteristics of the server in a mapping table, wherein the external characteristics of the server comprise an external IP address and an external port number of the server, and the internal characteristics of the server comprise an internal IP address and an internal port number of the server, wherein the external IP address is configured to be the public IP address; and
a processor, configured to:
determine whether a destination IP address and a destination port number carried in a first message received from the device match the external characteristics of the server by looking up the mapping table;
modify the first message by replacing the destination IP address and the destination port number carried in the first message with the internal IP address and the internal port number that are correlated to the external IP address and the external port number of the server in the mapping table if the destination IP address and the destination port number carried in the first message match the external characteristics of the server; and forward the modified first message to the server, wherein the correlation is established according to parameters configured by a user on the routing apparatus, the parameters comprise the external IP address, the external port number, the internal IP address and the internal port number of the server.

15. The routing apparatus according to claim 14, wherein the external characteristics further comprise an external protocol code of the server, the internal characteristics further comprise an internal protocol code of the server, and the first message further comprises a protocol code, and in determining whether a destination IP address and a destination port number carried in a first message received from the device match the external characteristics of the server by looking up the mapping table, the processor is configured to:

determine whether the destination IP address, the destination port number and the protocol code carried in the first message match the external IP address, the external port number and the external protocol code of the server by looking up the mapping table.

16. The routing apparatus according to claim 15, wherein the parameters further comprise the external protocol code of the server and the internal protocol code of the server.

17. The routing apparatus according to claim 14, wherein the processor is further configured to:

determine whether a source IP address and a source port number carried in a second message received from the server match the internal characteristics of the server by looking up the mapping table; and modify the second message by replacing the source IP address and the source port number carried in the second message with the external IP address and the external port number that are correlated to the internal IP address and the internal port number of the server in the mapping table if the source IP address and the source port number carried in the second message match the internal characteristics of the server.

* * * * *